(12) United States Patent
Barve et al.

(10) Patent No.: US 11,568,587 B2
(45) Date of Patent: Jan. 31, 2023

(54) PERSONALIZED MULTIMEDIA FILTER

(71) Applicant: International Business Machines Corporation, Armonk, NY (US)

(72) Inventors: Ketan Barve, Jersey City, NJ (US); Richard Zhihuai Xue, Plainsboro, NJ (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/216,762

(22) Filed: Mar. 30, 2021

(65) Prior Publication Data

US 2022/0319074 A1 Oct. 6, 2022

(51) Int. Cl.
| | |
|---|---|
| *G06T 11/60* | (2006.01) |
| *G06F 16/535* | (2019.01) |
| *G06T 5/00* | (2006.01) |
| *G06F 16/587* | (2019.01) |
| *G06F 16/58* | (2019.01) |

(52) U.S. Cl.
CPC ............ *G06T 11/60* (2013.01); *G06F 16/535* (2019.01); *G06F 16/587* (2019.01); *G06F 16/5866* (2019.01); *G06T 5/002* (2013.01)

(58) Field of Classification Search
CPC ....... G06T 11/60; G06T 5/002; G06F 16/587; G06F 16/535; G06F 16/5866
See application file for complete search history.

(56) References Cited

U.S. PATENT DOCUMENTS

| | | | |
|---|---|---|---|
| 7,974,989 B2 | 7/2011 | Aronowich | |
| 2005/0093890 A1* | 5/2005 | Baudisch | ................ G09G 5/14 345/639 |
| 2008/0201324 A1* | 8/2008 | Aronowich | ........... G06F 16/951 707/999.005 |

(Continued)

FOREIGN PATENT DOCUMENTS

WO 2017116839 A1 7/2017

OTHER PUBLICATIONS

"Personal Filters • Geofilter Studio", downloaded from the internet on Feb. 11, 2021, 5 pages, https://www.geofilter.studio/personal-filters/>.

(Continued)

*Primary Examiner* — Terrell M Robinson
(74) *Attorney, Agent, or Firm* — Erika R. DeCosty (57) ABSTRACT

A computer-implemented method for generating personalized image filters is disclosed. The computer-implemented method includes receiving a user request to generate a filter for an input image. The computer-implemented method further includes generating one or more keyword lists associated with the input image. The computer-implemented method further includes determining one or more themes associated with the input image based, at least in part, on one or more keywords selected from the one or more keyword lists. The computer-implemented method further includes identifying one or more candidate images matching the one or more themes associated with the image. The computer-implemented method further includes generating one or more personalized image filters based on one or more features from one or more of the candidate images.

20 Claims, 4 Drawing Sheets

(56) References Cited

U.S. PATENT DOCUMENTS

| | | | |
|---|---|---|---|
| 2012/0102431 A1* | 4/2012 | Krolczyk | G06F 16/489 |
| | | | 715/790 |
| 2012/0176401 A1* | 7/2012 | Hayward | G06F 3/04883 |
| | | | 345/173 |
| 2016/0364625 A1* | 12/2016 | Lin | G06T 7/60 |
| 2017/0185581 A1* | 6/2017 | Bojja | G06F 16/353 |
| 2018/0082407 A1* | 3/2018 | Rymkowski | G06T 11/60 |
| 2018/0113587 A1 | 4/2018 | Allen | |
| 2018/0191797 A1 | 7/2018 | Javier | |
| 2019/0280997 A1 | 9/2019 | Baldwin | |
| 2020/0162666 A1 | 5/2020 | Sehn | |
| 2020/0167832 A1 | 5/2020 | Pinel | |

OTHER PUBLICATIONS

"Snap Inc.—News", Investor Relations, Monthly Investor Newsletter, Feb. 2, 2021, 5 pages, <https://investor.snap.com/news/default.aspx>.

"Turn Your Photos Into Art", DeepArt, <https://deepart.io/>, downloaded from the Internet on Feb. 11, 2021, 6 pages.

Dave, Paresh, "The thinking behind Snapchat's sports and weather filters", Los Angeles Times, Sep. 19, 2017, 12 pages, <https://www.latimes.com/business/technology/la-fi-tn-snapchat-dynamic-geofilters-20170919-htmlstory.html>.

Dove, Jackie, "The Best A.I.-based Photo Apps for iOS and Android", Digital Trends, Nov. 18, 2019, 16 pages, <https://www.digitaltrends.com/mobile/best-ai-based-photo-apps/>.

Fu et al., "Image Aesthetics Assessment Using Composite Features From Off-The-Shelf Deep Models", arXiv:1902.08546v1 [cs.CV] Feb. 22, 2019, 5 pages.

Ma et al., "Going Deeper into First-Person Activity Recognition", 2016 IEEE Conference on Computer Vision and Pattern Recognition, DOI 10.1109/CVPR.2016.209, 10 pages.

PARK et al., "HARRISON: A Benchmark on HAshtag Recommendation for Real-world Images in SOcial Networks", arXiv:1605.05054v1 [cs.CV] May 17, 2016, 11 pages.

Tweedie, Steven, "Everyone Can Use Snapchat's New Geofilters Starting Today—Here's How They Work", Dec. 2, 2014, 9 pages, <https://www.businessinsider.com/how-to-use-snapchat-geofilters-2014-12>.

Yuan, Raymond, "Neural Style Transfer: Creating Art with Deep Learning using tf.keras and eager execution", TensorFlow, Aug. 3, 2018, 22 pages, <https://medium.com/tensorflow/neural-style-transfer-creating-art-with-deep-learning-using-tf-keras-and-eager-execution-7d541ac31398>.

* cited by examiner

PERSONALIZED MULTIMEDIA FILTER

BACKGROUND

The present invention relates generally to the field of multimedia filters, and more particularly to personalized multimedia filters.

Multimedia filters are filters that use augmented reality (AR) effects by layering digital media onto an existing image or video. Adding a filter to an image or video imposes different or added facial features or objects. Filters can also superimpose a different background onto the image or video.

Some multimedia filters blend one or more images into one singular image or video. Image stylization is the process of taking an image as input and producing a stylized version as output. Neural style transfer is an optimization technique used to take two images and blend them together. In neural style transfer, a content image and a style reference image are blended together to create an output image depicting the content image, but "stylized" or in the style of the style reference image.

SUMMARY

According to one embodiment of the present invention, a computer-implemented method for generating personalized image filters is disclosed. The computer-implemented method includes receiving a user request to generate a filter for an input image. The computer-implemented method further includes generating one or more keyword lists associated with the input image. The computer-implemented method further includes determining one or more themes associated with the input image based, at least in part, on one or more keywords selected from the one or more keyword lists. The computer-implemented method further includes identifying one or more candidate images matching the one or more themes associated with the image. The computer-implemented method further includes generating one or more personalized image filters based on one or more features from one or more of the candidate images.

According to another embodiment of the present invention, a computer program product for generating personalized image filters is disclosed. The computer program product includes one or more computer readable storage media and program instructions stored on the one or more computer readable storage media. The program instructions include instructions to receive a user request to generate a filter for an input image. The program instructions further include instructions to generate one or more keyword lists associated with the input image. The program instructions further include instructions to determine one or more themes associated with the input image based, at least in part, on one or more keywords selected from the one or more keyword lists. The program instructions further include instructions to identify one or more candidate images matching the one or more themes associated with the image. The program instructions further include instructions to generate one or more personalized image filters based on one or more features from one or more of the candidate images.

According to another embodiment of the present invention, a computer system for generating personalized image filters is disclosed. The computer system includes one or more computer processors, one or more computer readable storage media, computer program instructions, the computer program instructions being stored on the one or more computer readable storage media for execution by the one or more computer processors. The program instructions include instructions to receive a user request to generate a filter for an input image. The program instructions further include instructions to generate one or more keyword lists associated with the input image. The program instructions further include instructions to determine one or more themes associated with the input image based, at least in part, on one or more keywords selected from the one or more keyword lists. The program instructions further include instructions to identify one or more candidate images matching the one or more themes associated with the image. The program instructions further include instructions to generate one or more personalized image filters based on one or more features from one or more of the candidate images.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of multimedia filters, and more particularly to personalized multimedia filters.

Oftentimes, users want to add a personalized filter to a picture or video. Typically, when a user takes a photo or video and wants to add a filter, the user can only add a limited number of predetermined, generic filters, or elements to add to their photo or video. Oftentimes, the user must also take the extra step of using a hashtag, adding a caption, or searching for particular elements for these predetermined, generic filters, or elements to be displayed. These predetermined filters are usually based on information gathered from standard databases. These standard databases are typically owned by the social media platform and thus the pictures or videos for generating a filter are limited. Proposed predefined filters are typically selected, for example, based on the user's location, time, and/or tags. Meaning, if the user takes a photo in Miami, Fla., filters particular to Miami, Fla. will appear. For example, a user may select the words "Miami, Fla." for use as a caption for their photo. In another example, a user may select an image of the beach as a filter for their photo. In yet another example, if a user takes a photo at a concert, filters of the concert singers or bands will appear for the user to select. However, in many instances, users wish to add a more personalized filter to their photo or video. Embodiments of the present invention recognize that users are limited to a number of predefined elements of the filters and often struggle to find unique and personalized filters. Embodiments of the present invention further recognize that users need easily accessible, dynamic, relevant, and personalized filter elements to use with their photos and videos.

Embodiments of the present invention improve upon the foregoing deficiencies of personalizing multimedia filters for a user by taking into account the user's location, events, weather, the users other social media posts, and who the user is with at the time the photo or video is taken. Embodiments of the present invention combine information gathered from and about the user and photo or video desired to be filtered to create a personalized filter unique to the user.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
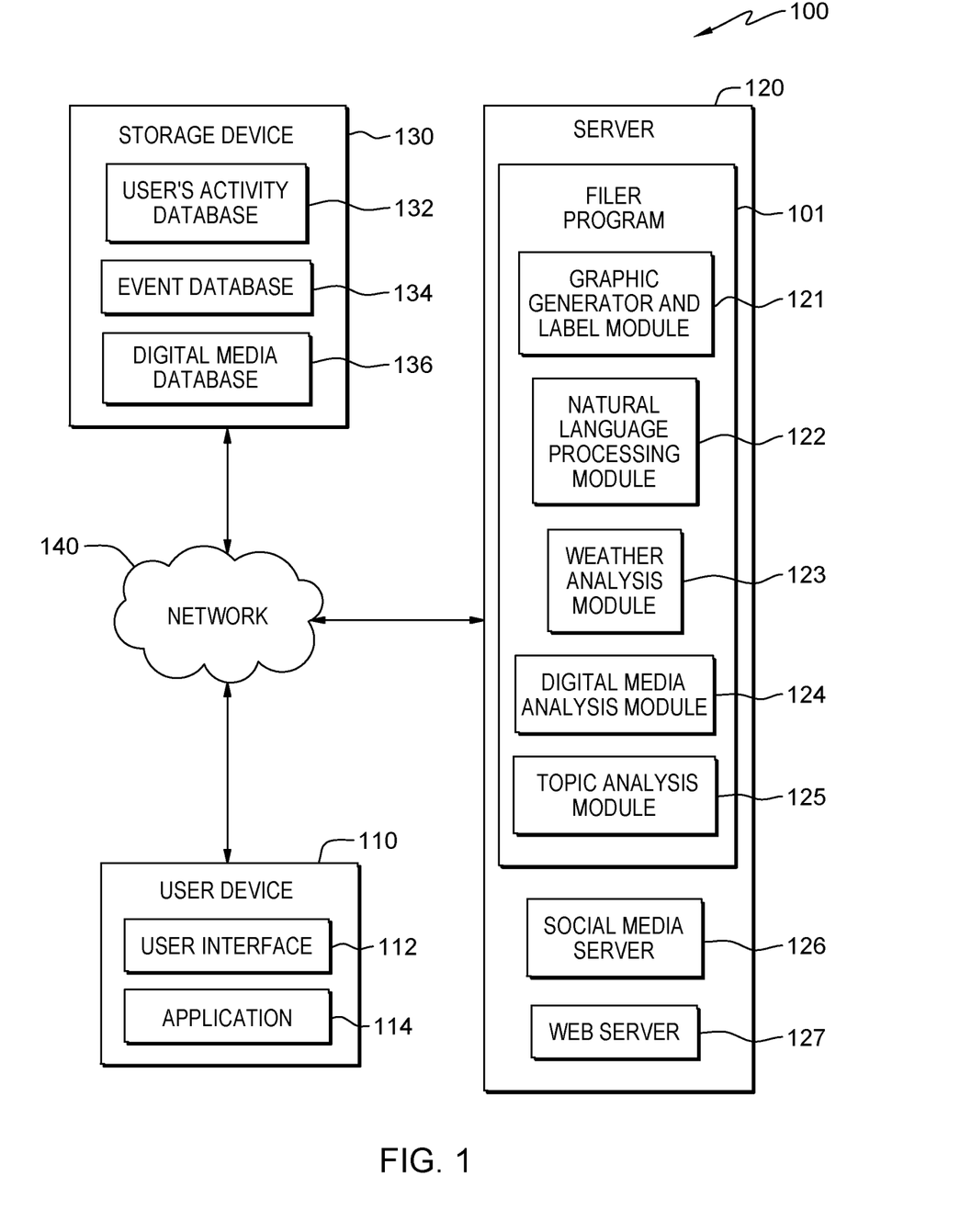
FIG. 1 is a block diagram of a system, generally designated 100, in accordance with at least one embodiment of the present invention.

The present invention will now be described in detail with reference to the Figures. FIG. 1 is a functional block diagram of a computing system, generally designated 100, for automatic image annotating in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 4.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays the input photo, filters, and result image.

Application 114 can be representative of one or more applications (e.g., an application suite) that operate on user device 110. In various example embodiments, application 114 can be an application that a user of user device 110 utilizes to apply a personalized filter to an input image via user interface 112. In other embodiments, application 114 can be another mobile device application (e.g., a web browser, enterprise-specific messaging application, social media application, etc.). For example, application 114 is a client-side application associated with server 120 (e.g., a client-side application associated with filter program 101).

In an additional embodiment, application 114 can operate to perform processing steps of filter program 101 (i.e., application 114 can be representative of filter program 101 operating on user device 110), in accordance with various embodiments of the present invention. For example, a user of user device 110 can take, upload, and apply a personalized filter to a photo or video via application 114. In an embodiment, application 114 monitors users' social media activity to determine what the user likes and the user's preferences. In some embodiments, application 114 determines the user's location, the current weather at the user's location, and who the user is with.

Server 120 can be a standalone computing device, management server, a web server, a mobile computing device, or any other electronic computing system capable of receiving, sending, and processing data. In another embodiment, server 120 can be a laptop computer, a tablet computer, a notebook computer, a personal computer, a desktop computer, or any programmable electronic device capable of communicating with other computing devices within computing system 100 via a network, such as network 140. In general, server 120 is representative of any electronic device or combination of electronic devices capable of executing computer readable program instructions.

In another embodiment, server 120 represents a computing system utilizing clustered computers and components (e.g., database server computers, application server computers, etc.) that can act as a single pool of seamless resources when accessed within computing system 100. Server 120 can include internal and external hardware components, as depicted and described in further detail with respect to FIG. 4.

Server 120 includes filter program 101, which further includes graphic generator and label module 121, natural language processing module 122, weather analysis module 123, digital media analysis module 124, and topic analysis module 125. In an embodiment, graphic generator and label module 121 is a component or sub-program of filter program 101 that generates and overlays a personalized filter for an input image or video. In an embodiment, natural language processing module 122 is a component or sub-program of filter program 101 that identifies and analyzes the text, location, hashtags, tags, and caption of the input image or video, and potential images or videos used to generate the personalized filter. For example, if a user includes the caption "Finally at my favorite bands concert" on their photo, natural language processing module 122 will identify the band playing at the concert was mentioned in the caption. Accordingly, filter program 101 may determine who is playing at the concert the user is attending based on the caption. In an embodiment, weather analysis module 123 is a component or sub-program of filter program 101 that determines the weather for the user's current location or the location where the picture or video was taken. In an embodiment, digital media analysis module 124 is a component or sub-program of filter program 101 that analyzes digital media used to generate personalized filters. In an embodiment, digital media analysis module 124 analyzes digital media uploaded or otherwise selected by a user to be overlaid with a filter. In some embodiments, digital media analysis module 124 analyzes digital media stored in digital media database 136. In other embodiments, digital media analysis module 124 analyzes digital media located on external platforms, such as social media applications, websites, and online databases. In an embodiment, topic analysis module 125 is a component or sub-program of filter program 101 that analyzes the user's activity to identify a topic or message associated with the input photo or video.

In an embodiment, server 120 may be a combination of one or more of a social media server 126 and a web server 127. Social media 126 server contains information from the user's social media. For example, social media server 126 contains information about what types of posts the user "likes" on social media. In an embodiment, social media server 126 contains past stories, statuses, pictures, videos, comments, and captions the user has uploaded. Web server 127 contains information and metadata associated with the user's search history on the web. For example, if the user frequently searches for information about a particular band, web server 127 will store the information about the particular band that the user often searches for information about.

Graphic generator and label module 121 is a component or sub-program of filter program 101 used to generate personalized filters for an input image or video. In an embodiment, graphic generator and label module 121 generates the personalized filter to be overlaid on the input image or video. For example, if stickers or pictures of a unique outfit from a famous movie and a soccer ball are selected by filter program 101 to generate a personalized filter, graphic generator and label module 121 blends or incorporates the input photo or video with stickers or pictures of the unique outfit from a famous movie and the soccer ball. In an embodiment, graphic generator and label module 121 uses image stylization to blend or filter the input photo or video with the selected stickers or filters. Image stylization is the process of taking an image as input and producing a stylized version as output. In an embodiment, graphic generator and label module 121 uses neural style transfer to blend or filter the input photo or video with the selected stickers or filters. Neural style transfer is an optimization technique used to take two images and blend them together. In neural style transfer, a content image and a style reference image are blended together to create an output image depicting the content image, but is "stylized" or in the style of the style reference image.

Natural language processing module 122 is a component or sub-program of filter program 101 used to analyze information about the input image or video. Natural language processing is a subfield of linguistics, computer science, and artificial intelligence for processing natural language data. In various embodiments, natural language processing module 122 separates words, for example, through the use of word segmentation or tokenization. Word segmentation is the separation of continuous text into words. For example, the text of a caption or words overlaid on the photo or video are separated into individual words. Tokenization is the process of breaking up and classifying sections of a string of input characters. For example, the text of a caption or words overlaid on the photo or video are broken up into words, sentences, or phrases. In various embodiments, filter program 101 stores the individual words and individual sentences as keyword data in storage device 130.

Weather analysis module 123 is a component or sub-program of filter program 101 used to determine the weather for the user's current location or for the time and location at which the photo or video was taken. For example, if filter program 101 determines the user is in Miami, Fla. when a photo was taken, weather analysis module 123 may determine it was sunny and 80 degrees when the photo or video was taken. In an embodiment, filter program 101 accesses the weather application on user device 110. In an embodiment, filter program 101 determines the user's location and performs a search query based on the determined user's location. In an embodiment, filter program 101 determines the user's location and determines the weather based on the user's location.

Digital media analysis module 124 is a component or sub-program of filter program 101 that digital media database 136. In an embodiment, filter program 101 generates a search query with certain keywords based on information gathered from analyzing the input photo or video. In an embodiment, digital media analysis module 124 searches digital media database 136 to find images, filters, or stickers relevant from the keyword list. For example, if the keyword list includes "Florida" and "soccer," digital media analysis module 124 searches digital media database 136 to find images, filters, or stickers about "Florida" and "soccer." In an embodiment, filter program 101 generates keyword queries based on the keyword list. For example, if the keyword list includes "Florida" and "soccer," filter program 101 generates a keyword query that includes the keywords "Florida and soccer." In an embodiment, filter program 101 searches digital media database 136 for images that match the keyword query.

Topic analysis module 125 is a component or sub-program of filter program 101 that analyzes the user's activity to identify a topic or message associated with the input photo or video. In an embodiment, the user's activity can include the user's email, texts, calls, social media, or web searches. In an embodiment, topic analysis module 125 determines the photo or videos caption, hashtags, people tagged in the photo, and text with natural language processing module 122. In an embodiment, topic analysis module 125 further determines the topic or message associated with the input photo or video. For example, if natural language processing module 122 determines the caption mentions "Spring break in Florida" topic analysis module 125 further determines the topics of "beach" and "vacation" associated with the input photo or video.

Storage device 130 includes user's activity database 132, event database 134, and digital media database 136. User's activity database 132 contains information on the user's location, preferences, social media interaction, social media posts, friends lists, text messages, and the calendar. In an embodiment, social media interactions can include, but are not limited to, one or more of a post, like, comments, status, reply, repost, retweet, search, or other social media information. Event database 134 contains information for events, concerts, parades, and festivals. For example, event database 134 contains the dates, times, attendees, and locations for events. In an embodiment, filter program 101 determines and cross-references event tickets the user has purchased with the time, location, and event type of the ticket and stores this information in event database 134. Digital media database 136 is a database of images, stickers, text, or filters which can be used as or part of filters on videos or images. In an embodiment, filter program 101 accesses digital media database 136 to search for images, stickers, or filters to overlay on the input image.

Filter program 101 stores and retrieves various data from storage device 130, including, but not limited to, the user's social media information, location information, friend's social media and location information, weather conditions, schedules, and events. For example, filter program 101 stores information including the user's location at the time a photo or video was taken in user's activity database 132. Filter program 101 retrieves the information on the user's location from storage device 130 to determine where the user is or was when the picture or video was taken. In another example, filter program 101 stores information including the user's social media activity information in user's activity database 132. In this example, filter program 101 retrieves the information on the user's social media activity from storage device 130 to determine what the user likes or their preferences such as music taste, friends, or upcoming events. In an embodiment, filter program 101 determines the user's relationship to other people on their social media or images. In an embodiment filter program 101 determines the user's location at the time the photo or video was taken and compares it with event database 134 to determine if there is an event taking place where the user was when the photo or video was taken. In an embodiment, filter program 101 utilizes the information regarding the user's preferences, upcoming events, and location to generate personalized filters.

In an embodiment, filter program 101 determines the context of a photo or video, such as determining what the photo or video is based on the caption. In an embodiment, filter program 101 determines the context of the photo or video based on the content of the photo or video. For example, filter program 101 determines the context of the photo or video based on the objects in the photo or video. In an embodiment, filter program 101 uses image recognition to determine the context of the photo. Image recognition is a computer vision technique that allows machines to interpret and categorize what is in an image and label what is in the image. In an embodiment, filter program 101 determines the context of the photo by the facial expressions of the people in the photo. For example, if filter program 101 determines everyone is smiling in the input image, filter program 101 can determine the context of the input image to be "happy."

In an embodiment, filter program 101 determines a video is a concert by the caption stating, "At my favorite concert" and stores this information in storage device 130. In an embodiment, filter program 101 generates a keyword list based on the context of the image or video and the user's preferences, location, or who they are with. In these embodiments, filter program 101 searches digital media database 136 for images that match elements of the keyword list. In an embodiment, filter program 101 stores and retrieves images that match elements of the keyword list from storage device 130.

Storage device 130 can be implemented with any type of storage device which is capable of storing data that may be accessed and utilized by server 120 and user device 110 such as a database server, a hard disk drive, or a flash memory. In an embodiment, storage device 130 can represent multiple storage devices and collections of data within server 120.

In an embodiment, filter program 101 generates a personalized filter for a user based on, but not limited, to one or more of the user's preferences, location, event, and context of the input photo or video. For example, if filter program 101 determines the user is at a famous concert and the user likes fashion, filter program 101 generates a filter including the clothing of the famous singer at the concert over the user in a photo. In an embodiment filter program 101 monitors the user's social media or web interactions in order to determine the users likes and preferences. For example, if filter program 101 determines the user is in multiple social media groups for a particular sport, team, or club, filter program 101 can generate filters including that particular sport or club. In an embodiment, filter program 101 generates a personalized filter from images or videos included on the user's social media pages or social media pages that the user follows or is otherwise connected to. For example, if filter program 101 determines the user likes a significant amount of social media posts (i.e., a number of social media posts above a predetermined threshold) from a particular band, artist, actor, or actress, filter program 101 can generate filters including that particular band, artist, actor, or actress.

In an embodiment, filter program 101 receives input digital media. In an embodiment, the digital media can be an image or a video. In an embodiment, the digital media is taken in real time on user device 110. In an embodiment, the digital media is taken at a previous time and is uploaded at a later time. In an embodiment, filter program 101 overlays a blended filter over the users camera view on user device 110 before the user takes the input digital media. In these embodiments, the user can accept or deny the use of the blended filter overlaid onto the input digital media.

In an embodiment, filter program 101 determines the user's location. In an embodiment, filter program 101 determines the user's location through a GPS enabled application on user device 110. In an embodiment, filter program 101 determines the user's location in real time. In an embodiment filter program 101 determines the user's location at the time an image or video was taken. In an embodiment, filter program 101 utilizes the weather analysis module 123 to determine the weather at the user's location. In an embodiment, filter program 101 determines the weather in real time. In an embodiment, filter program 101 determines the weather at the time the photo or video was taken.

In an embodiment, filter program 101 determines the context of the image. In an embodiment, filter program 101 utilizes natural language processing module 122 and topic analysis module 125 to determine the context of the image. In an embodiment, natural language processing module 122 determines what words the user uses in the input photos caption or hashtags and topic analysis module 125 determines the context of the words. For example, if natural language processing module 122 determines the caption on the input photo says "first game of the season" with emojis of a baseball, topic analysis module 125 may further determine the context of the image to be a photo of a baseball game. In another embodiment, filter program 101 determines who else is either in the input image or with the user at the time the input image was taken. In an embodiment, filter program 101 determines the user's location and compares the user's location to events in the area to determine or verify what type of event the user is attending in the input image or video.

In an embodiment, filter program 101 determines the user's preferences. In an embodiment, filter program 101 determines the user's preferences based on information in user's activity database 132. In an embodiment, user preferences include types of things, places, objects, or teams the user prefers. In an embodiment, filter program 101 determines the user's preferences by their social media activity. For example, if filter program 101 determines the user likes a significant number of posts about historical non-fiction literature, filter program 101 determines the user is a fan of historical non-fiction literature books and prefers historical non-fiction literature books. In another example, filter program 101 determines that the user is a member of multiple social media groups for knitting. In this example, filter program 101 determines that the user prefers knitting. In an embodiment, filter program 101 determines the user's preferences from previously used filters. For example, if the user previously used a filter with golf clubs, filter program 101 determines the user prefers golfing.

In an embodiment, filter program 101 generates keyword lists based on a variety of factors, including, but not limited, to one or more of the user's preferences, context of the photo or video, location information, weather information, event information, calendar information, and social media information. In an embodiment, filter program 101 searches a database for images or other visual elements that have tags or a context that matches keywords from the keyword list. For example, if a keyword list includes "cheetah print" "fashion" and "soccer," filter program 101 searches a database and saves images for cheetah print clothes and a sticker of a soccer ball. In an embodiment, filter program 101 searches a user's social media pages or the social media pages of friends to generate a keyword list. For example, if the user or the user's friends like a particular image, post, or conversation, filter program 101 generates a keyword list based on those images, posts, or conversations that are liked by the user or the user's friends. In an embodiment, filter program 101 generates personalized filters based on the keyword list. For example, if a keyword list includes the keywords "cheetah print" "fashion" and "soccer," filter program 101 can generate a filter overlaid onto a photo of the user showing the user in cheetah print clothing and a soccer ball sticker.

In an embodiment, filter program 101 generates the keyword list based, at least in part, on the user's preferences. For example, if filter program 101 determines the user prefers golfing, filter program 101 will add "golfing" to the keyword list. In an embodiment, filter program 101 further generates a keyword list based, at least in part, on the input image. For example, if filter program 101 determines the input image is of the user at a baseball game, filter program 101 generates a keyword list based on the baseball game. In this example, filter program 101 generates a keyword list containing "baseball" and "game." In this example, filter program 101 also incorporates the user preferences into the keyword list and adds "golfing" "travel" and "yoga" to the keyword list.

In an embodiment, filter program 101 filters out generic words from the keyword list. For example, if filter program 101 determines the input image is of the user at a baseball game and generates a keyword list containing "baseball" "game" and "golfing," filter program 101 removes "game" from the keyword list as it may be too generic.

In an embodiment, filter program 101 generates additional keywords from the keywords included in a keyword list based on concept expansion software (i.e., semantic lexicon induction software or semantic set expansion software). Concept expansion software infers additional keywords, topics, themes, or concepts from a seed word(s) that may potentially be related to a particular keyword, topic, theme, or concept. In an embodiment, filter program 101 assigns a higher score to a parent or seed keyword than those expanded keywords generated from the parent keyword. For example, if a keyword list includes the words "sand," "ocean," "waves," and "sun," filter program 101 further generates expanded keywords such as "beach," "sea," "surf," and "rays" from the parent words "sand," "ocean," "waves," and "sun," respectively. In this example, the parent keywords "sand," ocean," "waves," and "sun," are assigned a higher score than the expanded keywords "beach," "sea," "surf," and "rays."

In an embodiment, filter program 101 generates additional themes (i.e., topic clusters or concepts) associated with a keyword list based, at least in part, on one or more of the parent keywords and the expanded keywords included in the keyword list. For example, if a keyword list includes the words "sand," "ocean," "waves," and "sun," filter program 101 may assign the theme "beach" to the keyword list. Continuing with this example, filter program 101 may further generate and assign expanded themes of "vacation," "travel," and "seaside," to the keyword list.

In an embodiment, filter program 101 generates a score for each keyword list. In an embodiment, the total scores of all words in the keyword list is a keyword list score. In an embodiment, the score associated with the number of occurrences of the words in the keyword list. Using the above example, if "baseball" was mentioned four times in the caption of the input image and "golfing" was mentioned once, "baseball" will receive a higher score than "golfing." In another embodiment, filter program 101 determines a score for each word based on how frequently or the number of occurrences the user "likes" or uploads other social media posts about the word. In an embodiment, the score is based on the number of occurrences that a context of an image posted on a social media page of the user and connected network accounts of a social media account of the user. In an embodiment, the score is based on the number of instances that the context of an image or video posted on the user's social media page or a friend of the user's social media page is associated with a particular word(s). For example, if filter program 101 determines that the user posts more about yoga than golfing, yoga will receive a higher score than golfing.

In an embodiment, filter program 101 averages the scores of each keyword in the keyword list. For example, filter program 101 analyzes the caption of the input image and creates a first word list of: "baseball (score=0.8), golf (score=0.2) and analyzes the user's social media activity and creates a second word list of: "baseball (score=0.9), golf (score=0.1), yoga (score=0.6), travel (score=0.4). In this example, filter program 101 determines the average scores of each keyword across the list as: baseball (score=0.85), golf (score=0.15), yoga (score=0.3), and travel (score=0.2). In this example, filter program 101 determines baseball and yoga are the two highest scored keywords.

In an embodiment, filter program 101 determines themes for the keyword lists. In an embodiment, the theme of the keyword lists is associated with the location, event, activity, or preference of a user. In an embodiment, themes are generated based on combinations of one or more keywords generated. For example, if filter program 101 determines that the user took the input image at a park for a concert with the caption "so excited for the concert!", filter program 101 determines the user looks happy in the input image. Filter program 101 further determines the user is at Park A based on the user's location at the time the input image was taken. Filter program 101 further determines that the user purchased tickets for Singer B for a concert at Park A. Filter program 101 further determines the user's preferences of yoga, travel, and Singer B. In this example, filter program 101 generates keyword lists based on the determined themes. For example, the first keyword list includes "concert" "music" "Singer B" and the second keyword list includes "park A" "yoga" "travel". In an embodiment, filter program 101 determines a list of theme candidates and ranks the theme candidates by score. In an embodiment, filter program 101 generates a list of theme candidates with the highest score. Using the same example, filter program 101 generates one or more theme candidates of "Singer B" "Singer B+concert" "Park A+concert" "Park A+Singer B+concert", "concert+happy", etc.

In an embodiment, filter program 101 selects a predetermined number of candidate images. In some embodiments, filter program 101 selects a candidate image based on one or more keywords included in a keyword list. In other embodiments, filter program 101 selects a candidate image based on one or more themes generated from one or more keyword lists. In an embodiment, filter program 101 generates personalized image filters for those themes having a total keyword score above a predetermined threshold. In an embodiment, filter program 101 searches digital media database 136 to select a candidate image. In an embodiment, filter program searches social media pages corresponding to the user or the user's friend to select a candidate image. In an embodiment, filter program searches the Internet for a candidate image. In an embodiment, filter program 101 searches for images and other visual elements that match the theme candidates. In an embodiment, filter program 101 searches for one or more candidate images based on a predetermined number of theme candidates. For example, if filter program 101 generates one or more theme candidates of "Singer B" "Singer B+concert" "Park A+concert+fashion" "Park A+Singer B+concert+fashion", and "concert+happy+fashion", filter program 101 searches for images relating to each theme candidate list of "Singer B" "Singer B+concert" "Park A+concert+fashion" "Park A+Singer B+concert+fashion", and "concert+happy+fashion". In an embodiment, filter program 101 selects multiple candidate images. For example, if filter program 101 generates one or more theme candidates "Singer B" "Singer B+concert" "Park A+concert+fashion" "Park A+Singer B+concert+fashion", and "concert+happy+fashion" filter program 101 selects one or more candidate images relating to "Singer B" "Singer B+concert" "Park A+concert+fashion" "Park A+Singer B+concert+fashion", and "concert+happy+fashion". In this example, filter program 101 selects an image of a unique well-known outfit from Singer B to be overlaid on the user in the input image.

In an embodiment filter program 101 generates a personal stylized filter. In an embodiment, filter program 101 uses image stylization to generate the personal stylized filter. In an embodiment, filter program 101 uses neural style transfer to generate the personal stylized filter. In an embodiment, filter program 101 uses the one or more selected candidate images to generate a personal stylized filter. In an embodiment, filter program 101 preserves the content of the input image but styles the input image with the one or more selected candidate images. In an embodiment, filter program 101 determines where the background is uniform on the input image. In an embodiment, filter program 101 inputs a section of the personal stylized filter where the background is uniform. For example, if filter program 101 determines that the input image is of the user standing in front of the concert stage and the top left corner of the input image is uniform (e.g., an image of the sky), filter program 101 overlays part of the personal stylized filter in the top left corner. In another example, if filter program 101 determines that the input image includes the user wearing a white tee-shirt, filter program 101 overlays part of the personal stylized filter onto the tee-shirt of the user. In an embodiment, filter program 101 generates a blended image filter. In an embodiment, filter program 101 generates a blended image filter by combining two or more candidate images and overlaying the blended image filter onto the input image. In an embodiment, filter program 101 generates a blended image filter by blending or combining two or more candidate images into a single filter that is overlaid onto the input image. In an embodiment, filter program 101 generates a blended image filter based on overlaying a first feature of a first candidate image onto a first portion of the input image and overlaying a second feature of a second candidate image over a second portion of the input image.

In an embodiment, filter program 101 generates multiple personalized filters or blended image filters. In these embodiments, filter program 101 proposes to the user one or more personalized filters or blended image filters. In these embodiments, user can select or choose one or more personalized filters or blended image filters.

Figure 2:
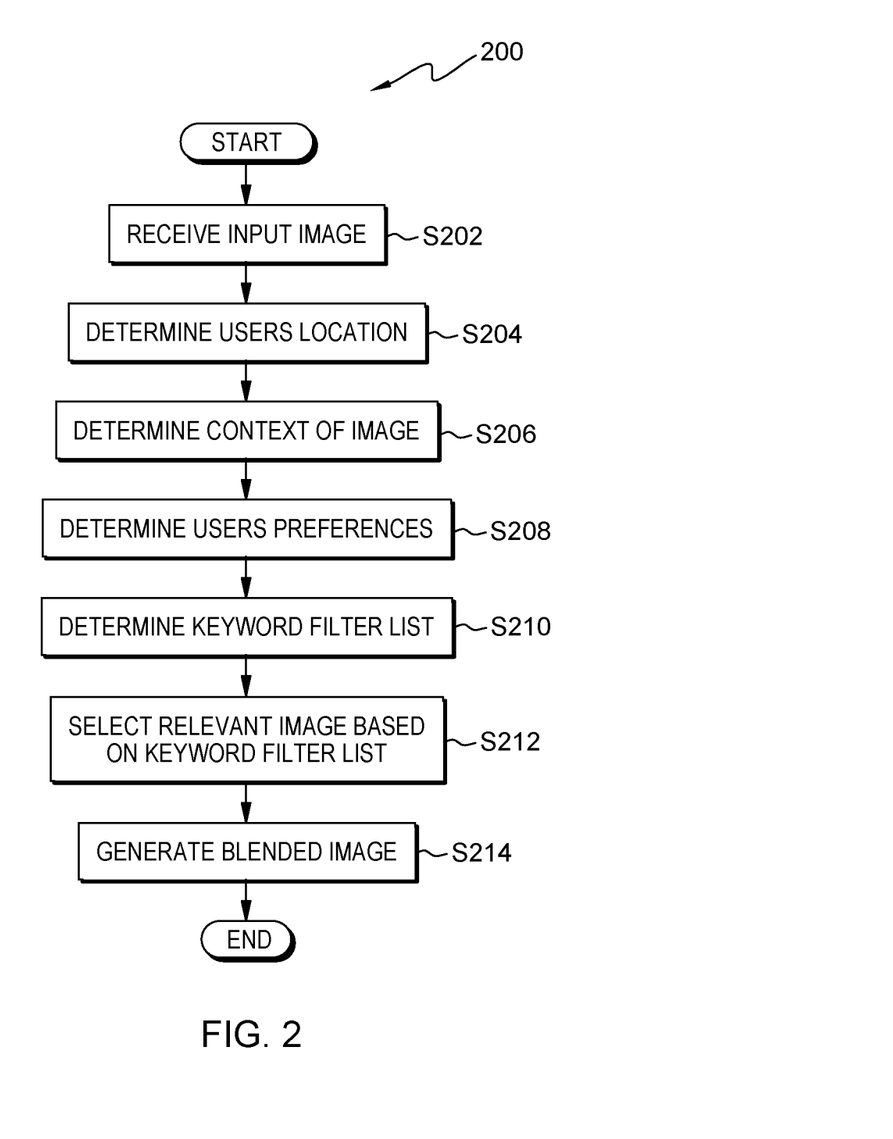
FIG. 2 is a flow chart diagram, generally designated 200, depicting operational steps for generating a personalized filtered image in accordance with at least one embodiment of the present invention.

FIG. 2 is a flow chart diagram, generally designated 200, depicting operational steps for generating a personalized filtered image in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, filter program 101 receives an input image. In an embodiment, the input image is a video or image. In an embodiment, the input image was taking at a previous time. At step S204, filter program 101 determines the user's location. At step S206, filter program 101 determines the context of the input image. In an embodiment, filter program 101 determines the context of the input image by the caption, text, location, hashtags, and tags of the input image. At step S208, filter program 101 determines the user's preferences. In an embodiment, filter program 101 determines the user's preferences by analyzing the users search history, social media, photos, videos, or previously used filters.

At step S210, filter program 101 determines the keyword filter list. In an embodiment, filter program 101 determines the keyword filter list based on the user's preferences and the context of the input image. In an embodiment, filter program 101 determines the keyword filter list based on a score for each keyword. In an embodiment, filter program 101 determines the keyword filter based on a predetermined score threshold for each keyword. In an embodiment, filter program 101 filters out generic words from the keyword filter list.

At step S212, filter program 101 selects a relevant image based on the keyword filter list. In an embodiment, filter program 101 selects one or more relevant images based on the keyword filter list. At step S214, filter program 101 generates a personalized image filter from the one or more relevant images. In an embodiment, filter program 101 generates a personalized blended image filter from the one or more relevant images.

Figure 3:
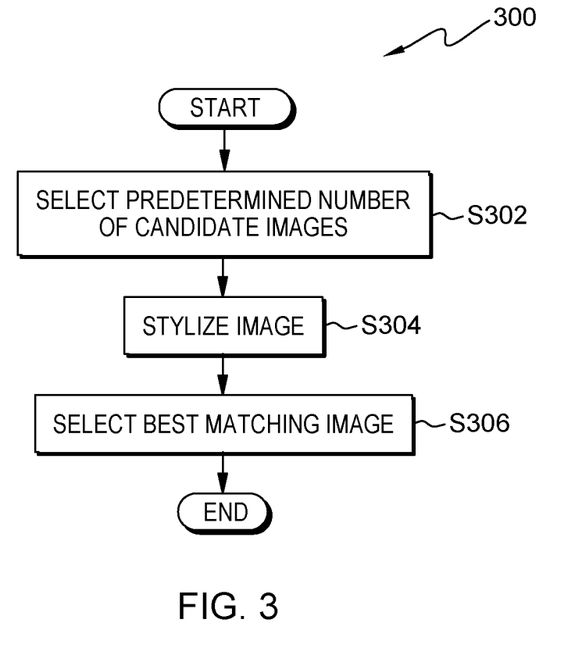
FIG. 3 is a flow chart diagram, generally designated 300, depicting operational steps for generating a personalized filtered image in accordance with at least one embodiment of the present invention.

FIG. 3 is a flow chart diagram, generally designated 300, depicting operational steps for generating a personalized filtered image in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, filter program 101 selects a predetermined number of candidate images.

At step S304, filter program 101 stylizes the input image based on one or more of the predetermined number of candidate images. For example, filter program 101 stylizes the same input image multiple times based on different candidate images. In an embodiment, filter program 101 uses image stylization to stylize the input image. In an embodiment, filter program 101 uses neural style transfer to stylize the input image. At step S306, filter program 101 selects the best matching candidate image used to stylize the input image. In an embodiment, the best matching candidate image used to stylize the input image is based on a score associated with a theme corresponding to a candidate image (e.g., a score generated for a theme formed from a total keyword score of those keywords in the one or more keyword lists associated with a particular theme. In an embodiment, the best matching candidate image used to stylize the input image is based on user input. For example, filter program may present to the user three stylized images and the user may select the best stylized image from the three stylized images. In an embodiment, filter program 101 generates a personal image filter based on the best stylized image.

Figure 4:
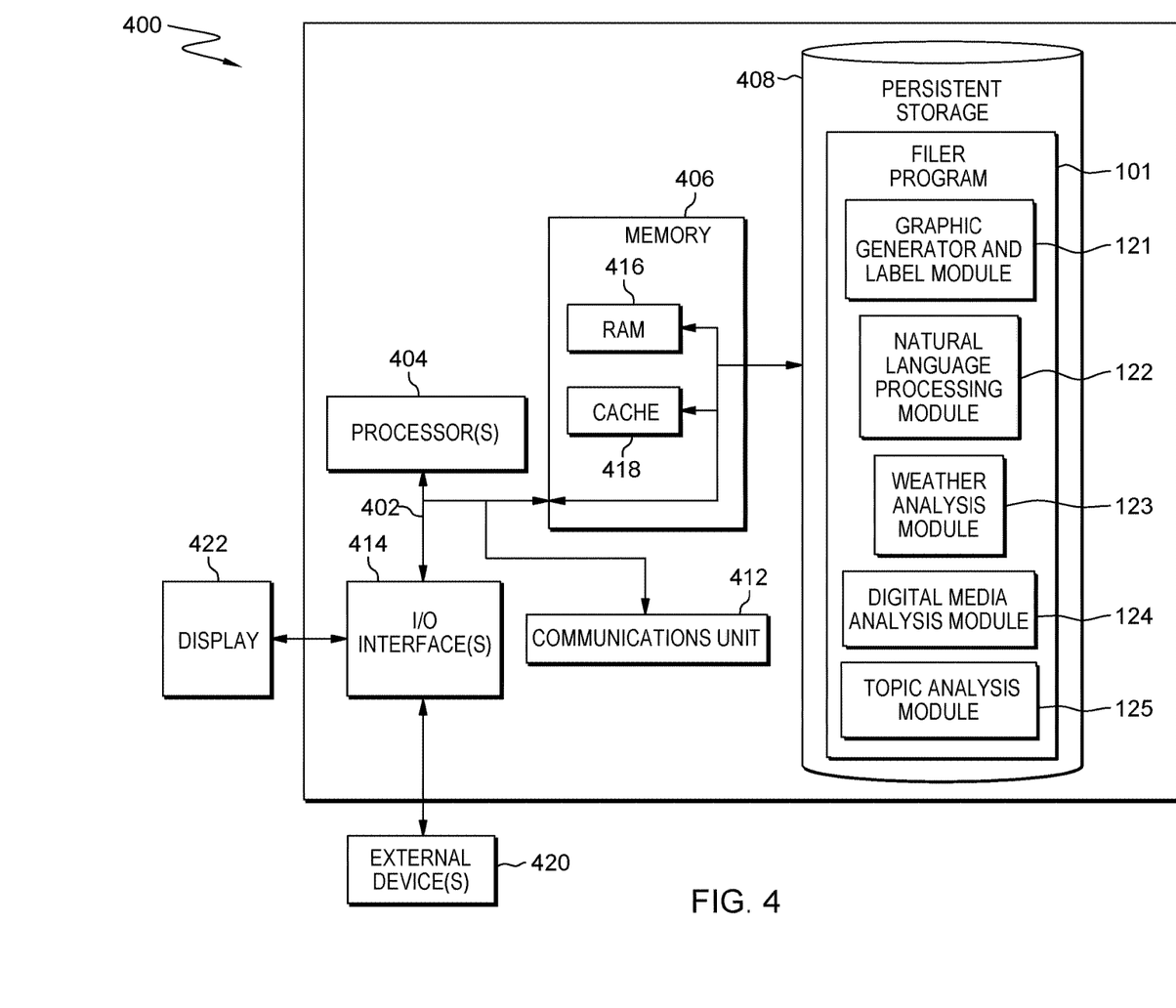
FIG. 4 is a block diagram depicting components of a computer, generally designated 400, suitable for executing filter program 101 in accordance with at least one embodiment of the present invention.

FIG. 4 is a block diagram depicting components of a computing device, generally designated 400, suitable for filter program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes filter program 101, including graphic generator and label module 121, natural language processing module 122, weather analysis module 123, digital media analysis module 124, and topic analysis module 125, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for filter program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

What is claimed is:

1. A computer-implemented method for generating personalized image filters, comprising:
    receiving a user request to generate a filter for an input image;
    generating one or more keyword lists associated with the input image;
    determining one or more themes associated with the input image based, at least in part, on one or more keywords selected from the one or more keyword lists;
    identifying one or more candidate images matching the one or more themes associated with the image;
    generating one or more personalized image filters based on one or more features from one or more of the candidate images; and
    blending the generated one or more personalized image filters with the input image using neural style transfer.

2. The computer-implemented method of claim 1, wherein generating the one or more keyword lists is based, at least in part, on the user's preferences, context of the input image, location information of the user at a time the input image is taken, weather information at the time the input image is taken, calendar information associated with the user, and social media information associated with the user.

3. The computer-implemented method of claim 1, further comprising:
   generating a score for each keyword in the keyword list, wherein the score is based on at least one of:
      a number of social media interactions associated with a keyword in the keyword list; and
      a number of occurrences that a context of an image posted on a social media page of the user and connected network accounts of a social media account of the user is associated with the keyword in the keyword list.

4. The computer-implemented method of claim 1, further comprising:
   generating a score for the one or more themes based on a total keyword score of those keywords included in the one or more keyword lists; and
   matching the one or more candidate images to those themes having a total keyword score above a predetermined threshold.

5. The computer-implemented method of claim 1, wherein blending the generated one or more personalized image filters with the input image further comprises using image stylization.

6. The computer-implemented method of claim 1, wherein blending the generated one or more personalized image filters with the input image further comprises:
   blending two or more features from the one or more candidate images into a single image filter.

7. The computer-implemented method of claim 1, wherein blending the generated one or more personalized image filters with the input image is formed by overlaying a first portion of a first candidate image onto a first portion of the input image and overlaying a second portion of a second candidate image onto a second portion of the input image.

8. A computer program product for generating personalized image filters, the computer program product comprising one or more computer readable storage media and program instructions stored on the one or more computer readable storage media, the program instructions including instructions to:
   receive a user request to generate a filter for an input image;
   generate one or more keyword lists associated with the input image;
   determine one or more themes associated with the input image based, at least in part, on one or more keywords selected from the one or more keyword lists;
   identify one or more candidate images matching the one or more themes associated with the image;
   generate one or more personalized image filters based on one or more features from one or more of the candidate images; and
   blending the generated one or more personalized image filters with the input image using neural style transfer.

9. The computer program product of claim 8, wherein generating the one or more keyword lists is based, at least in part, on the user's preferences, context of the input image, location information of the user at a time the input image is taken, weather information at the time the input image is taken, calendar information associated with the user, and social media information associated with the user.

10. The computer program product of claim 8, further comprising instructions to:
    generate a score for each keyword in the keyword list, wherein the score is based on at least one of:
       a number of social media interactions associated with a keyword in the keyword list; and
       a number of occurrences that a context of an image posted on a social media page of the user and connected network accounts of a social media account of the user is associated with the keyword in the keyword list.

11. The computer program product of claim 8, further comprising instructions to:
    generate a score for the one or more themes based on a total keyword score of those keywords included in the one or more keyword lists; and
    match the one or more candidate images to those themes having a total keyword score above a predetermined threshold.

12. The computer program product of claim 8, wherein the instructions to blend the generated one or more personalized image filters with the input image further comprises instructions to use image stylization.

13. The computer program product of claim 8, wherein the instructions to blend the generated one or more personalized image filters with the input image further comprises instructions to:
    blend two or more features from the one or more candidate images into a single image filter.

14. The computer program product of claim 8, wherein blending the generated one or more personalized image filters with the input image is formed by overlaying a first portion of a first candidate image onto a first portion of the input image and overlaying a second portion of a second candidate image onto a second portion of the input image.

15. A computer system for generating personalized image filters, comprising:
    one or more computer processors;
    one or more computer readable storage media; and
    computer program instructions, the computer program instructions being stored on the one or more computer readable storage media for execution by the one or more computer processors, the computer program instructions including instructions to:
       receive a user request to generate a filter for an input image;
       generate one or more keyword lists associated with the input image;
       determine one or more themes associated with the input image based, at least in part, on one or more keywords selected from the one or more keyword lists;
       identify one or more candidate images matching the one or more themes associated with the image;
       generate one or more personalized image filters based on one or more features from one or more of the candidate images; and
       blending the generated one or more personalized image filters with the input image using neural style transfer.

16. The computer system of claim 15, wherein generating the one or more keyword lists is based, at least in part, on the user's preferences, context of the input image, location information of the user at a time the input image is taken, weather information at the time the input image is taken, calendar information associated with the user, and social media information associated with the user.

17. The computer system of claim 15, further comprising instructions to:

generate a score for each keyword in the keyword list, wherein the score is based on at least one of:
a number of social media interactions associated with a keyword in the keyword list; and
a number of occurrences that a context of an image posted on a social media page of the user and connected network accounts of a social media account of the user is associated with the keyword in the keyword list.

18. The computer system of claim 15, further comprising instructions to:
generate a score for the one or more themes based on a total keyword score of those keywords included in the one or more keyword lists; and
match the one or more candidate images to those themes having a total keyword score above a predetermined threshold.

19. The computer system of claim 15, wherein the instructions to blend the generated one or more personalized image filters with the input image further comprises instructions to use image stylization.

20. The computer system of claim 15, wherein the instructions to blend the generated one or more personalized image filters with the input image further comprises instructions to:
blend two or more features from the one or more candidate images into a single image filter.

* * * * *